(12) United States Patent
Kim et al.

(10) Patent No.: US 8,391,476 B2
(45) Date of Patent: Mar. 5, 2013

(54) MASKING METHOD OF DEFENDING DIFFERENTIAL POWER ANALYSIS ATTACK IN SEED ENCRYPTION ALGORITHM

(75) Inventors: Chang Kyun Kim, Daejeon (KR); Chang Ho Jung, Daejeon (KR); Il Hwan Park, Daejeon (KR); E Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 528 days.

(21) Appl. No.: 12/685,076

(22) Filed: Jan. 11, 2010

(65) Prior Publication Data

US 2011/0013767 A1    Jan. 20, 2011

(30) Foreign Application Priority Data

Jul. 20, 2009  (KR) .................. 10-2009-0065769

(51) Int. Cl.
*H04K 1/00*  (2006.01)
(52) U.S. Cl. ........................................ 380/28; 713/189
(58) Field of Classification Search .................. None
See application file for complete search history.

(56) References Cited

U.S. PATENT DOCUMENTS

2004/0025032 A1*  2/2004  Chow et al. .................. 713/189
2006/0104443 A1*  5/2006  Chari et al. .................. 380/46
2007/0076864 A1*  4/2007  Hwang ........................ 380/29
2010/0272264 A1* 10/2010  Goubin et al. ............... 380/277
2011/0228928 A1*  9/2011  Trichina ...................... 380/28
2012/0047417 A1*  2/2012  Koike .......................... 714/761

FOREIGN PATENT DOCUMENTS

| KR | 2003-0051111 A | 6/2003 |
| KR | 1020050092576 A | 9/2005 |
| KR | 10-0668664 B1 | 1/2007 |
| KR | 10-0737171 B1 | 7/2007 |

OTHER PUBLICATIONS

Joon-Ho Hwang: "Efficient Hardware Architecture of SEED S-box for Smart Cards"; Journal of Semiconductor Technology and Science, vol. 4, No. 4, Dec. 2004, pp. 307-311.*

Hyungso Yoo et al; "A Secure Masking-based ARIA Countermeasure for Low Memory Environment Resistant to Differential Power Attack", Journal of The Korea Institute of Information Security & Cryptology, vol. 16 (3), pp. 143-155, Jun. 2006.

* cited by examiner

*Primary Examiner* — Jeffrey Pwu
*Assistant Examiner* — Carlos Amorin
(74) *Attorney, Agent, or Firm* — Ladas & Parry LLP (57) ABSTRACT

A plurality of S-boxes is masked by one masking inverse table. Therefore, the computation cost and the use amount of the RAM necessary for masking at the time of a masking operation for defending a differential power analysis attack in a SEED encryption algorithm can be effectively reduced.

18 Claims, 5 Drawing Sheets

MASKING METHOD OF DEFENDING DIFFERENTIAL POWER ANALYSIS ATTACK IN SEED ENCRYPTION ALGORITHM

CROSS-REFERENCE TO RELATED APPLICATION

This application claims priority to and the benefit of Korean Patent Application No. 10-2009-0065769, filed Jul. 20, 2009, the disclosure of which is incorporated herein by reference in its entirety.

BACKGROUND

1. Field of the Invention

The present invention relates to a masking method of defending a differential power analysis attack in a SEED encryption, and more particularly, to a method of improving an operation speed and memory efficiency at the time of a masking operation for defending a differential power analysis attack in a SEED encryption algorithm.

2. Discussion of Related Art

Unlike a differential cryptanalysis or a linear cryptanalysis, which are mathematical analysis methods, a side channel analysis attack introduced by Paul C. Kocher in 1996 uses side channel information generated in an encryption device in which an encryption algorithm is implemented. The side channel analysis attack is a large threat to equipments in which an encryption algorithm is implemented, and thus smart card application products perform a security test for the side channel analysis attack.

The side channel analysis attack uses extra information such as time in which an algorithm is performed, power consumption, or electromagnetic emission. A power analysis attack which uses power consumption is known as one of the most powerful side channel analysis attacks.

In the power analysis attack, when an encryption algorithm operates, a characteristic of power consumption measured in an encryption module at a point in time in which data related to a secret key is processed is analyzed to reveal a secret key. The power analysis attack is divided into a simple power analysis attack (SPA) and a differential power analysis attack (DPA).

Figure 1:
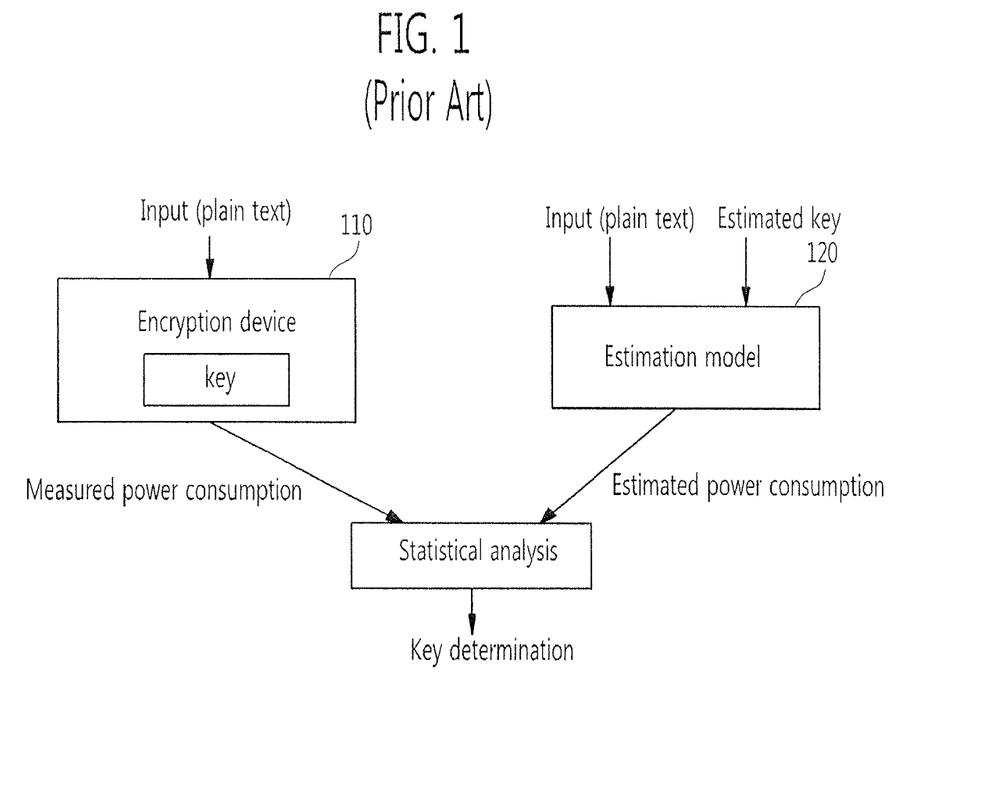
FIG. 1 is a view illustrating a general differential power analysis attack process.

FIG. 1 is a view illustrating a general differential power analysis attack process.

Referring to FIG. 1, an attacker establishes an estimation model 120 using information which can be typically acquired for an encryption device which it desires to attack. After establishing the estimation model 120, an estimated key and a plain text are input to the estimation model 120 to compute an intermediate value of an encryption algorithm and determine estimation power consumption according to the intermediate value.

The same plain text as the plain text input to the estimation model 120 is input to an attack target encryption device 110, and power consumption expended in the encryption device 110 during an operation of an encryption algorithm is measured. The measured power consumption is analyzed together with the estimation power consumption. Through the analysis, the attacker can finally acquire a key which is secret information of the encryption device.

Various methods of defending the different power analysis attack have been researched up to now. A masking technique is usually used because it can be relatively easily applied to an encryption algorithm at low cost.

In the masking technique, an intermediate value generated during an operation of an encryption algorithm is randomized so that an attacker cannot know it, and correlation between power consumption estimated by an attacker through an estimation model and power consumption generated in an actual encryption device is removed. For example, an addition masking which is one of masking techniques replaces an intermediate value "a" generated at the time of encryption with a value "$a_m = a \oplus m_a$" which an attacker cannot know using "$m_a$" which is randomly generated. Here, "$m_a$" is referred to as a mask, and this value is a value which is independently uniformly distributed.

However, most masking techniques which have been researched are based on an advanced encryption standard (AES), and the SEED which was developed in Korea has a structure different from the AES. Therefore, there is a problem in that masking techniques of the AES which has been suggested so far cannot be applied to the SEED as is.

For the foregoing reason, there is a need for a masking technique suitable for a SEED encryption algorithm which is used in low memory and low-speed operation environments such as smart cards.

SUMMARY OF THE INVENTION

The present invention is directed to a masking method of defending a differential power analysis attack in a SEED encryption algorithm.

The present invention is also directed to a masking method in which an operation speed and memory efficiency are improved at the time of a masking operation for defending against a differential power analysis attack in a SEED encryption algorithm.

An aspect of the present invention provides a masking method of defending a power analysis attack in a SEED encryption algorithm, including: generating an inverse table and first and second conversion tables and storing the inverse table and the first and second conversion tables as look-up tables; generating mask values necessary for masking; masking the inverse table to generate one masking inverse table; and when masked original to information is input, outputting a masked S-box using the one masking inverse table and the first and second conversion tables.

The generating of the inverse table and the first and second conversion tables may include: generating the inverse table using an inverse matrix and storing the inverse table as a look-up table; and generating the first and second conversion tables for addition conversion according to a use of the inverse table using binary matrices and storing the first and second conversion tables as look-up tables.

In the generating of the first and second conversion tables, the binary matrices $C_1$ and $C_2$ are as follows:

$$C_1 = \begin{pmatrix} 0 & 1 & 1 & 1 & 1 & 0 & 1 & 0 \\ 1 & 1 & 1 & 1 & 0 & 1 & 1 & 0 \\ 0 & 0 & 0 & 0 & 0 & 0 & 1 & 1 \\ 1 & 0 & 1 & 1 & 1 & 0 & 0 & 0 \\ 1 & 0 & 1 & 0 & 0 & 0 & 0 & 1 \\ 0 & 0 & 1 & 1 & 1 & 0 & 0 & 1 \\ 1 & 0 & 1 & 1 & 0 & 1 & 0 & 0 \\ 1 & 0 & 0 & 0 & 0 & 1 & 0 & 0 \end{pmatrix} C_2 = \begin{pmatrix} 0 & 0 & 1 & 0 & 1 & 0 & 0 & 1 \\ 0 & 0 & 1 & 0 & 1 & 1 & 0 & 1 \\ 1 & 0 & 0 & 1 & 0 & 1 & 1 & 0 \\ 1 & 1 & 1 & 0 & 1 & 0 & 0 & 1 \\ 0 & 1 & 0 & 0 & 1 & 1 & 0 & 0 \\ 1 & 0 & 1 & 1 & 1 & 0 & 0 & 0 \\ 0 & 1 & 0 & 0 & 0 & 0 & 0 & 0 \\ 1 & 0 & 1 & 1 & 1 & 0 & 1 & 0 \end{pmatrix}$$

The generating of the mask values may include generating six one-byte mask values $m_1$, $m_2$, $m_3$, $m_4$, $m_5$, and $m_6$ and two four-bit mask values $m_a$ and $m_b$ as follows:

$$m_1 = \text{rand}(\ ),\ m_2 = C_2[m_4] \oplus 0x38,\ m_3 = m_1 \oplus m_2,$$

$$m_4 = \text{rand}(\ ),\ m_5 = C_1[m_4] \oplus 0xa9,\ m_6 = m_3 \oplus m_5,$$

$$m_a = \text{rand}(\ ),\ m_b = \text{rand}(\ )$$

The masking inverse table outputs masked inverse information, corresponding to masked original information.

The outputting of the masked S-box using the one masking inverse table may further include: when the masked original information is input, outputting the masked inverse information corresponding to the masked original information using the masking inverse table; outputting the masked S-box corresponding to the masked inverse information using the first and second conversion tables; and masking the masked S-box to output an S-box which is masked by a certain masked value.

The masking method may further include, after the outputting of the masked S-box using the one masking inverse table, performing a masking addition (MA) operation for equally maintaining a masking value for a masking G function (MGF) including the masked S-box.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, exemplary embodiments of the present invention will be described in detail. However, the present invention is not limited to the embodiments disclosed below, but can be implemented in various forms. The following embodiments are described in order for this disclosure to be complete and enabling to those of ordinary skill in the art.

Figure 2:
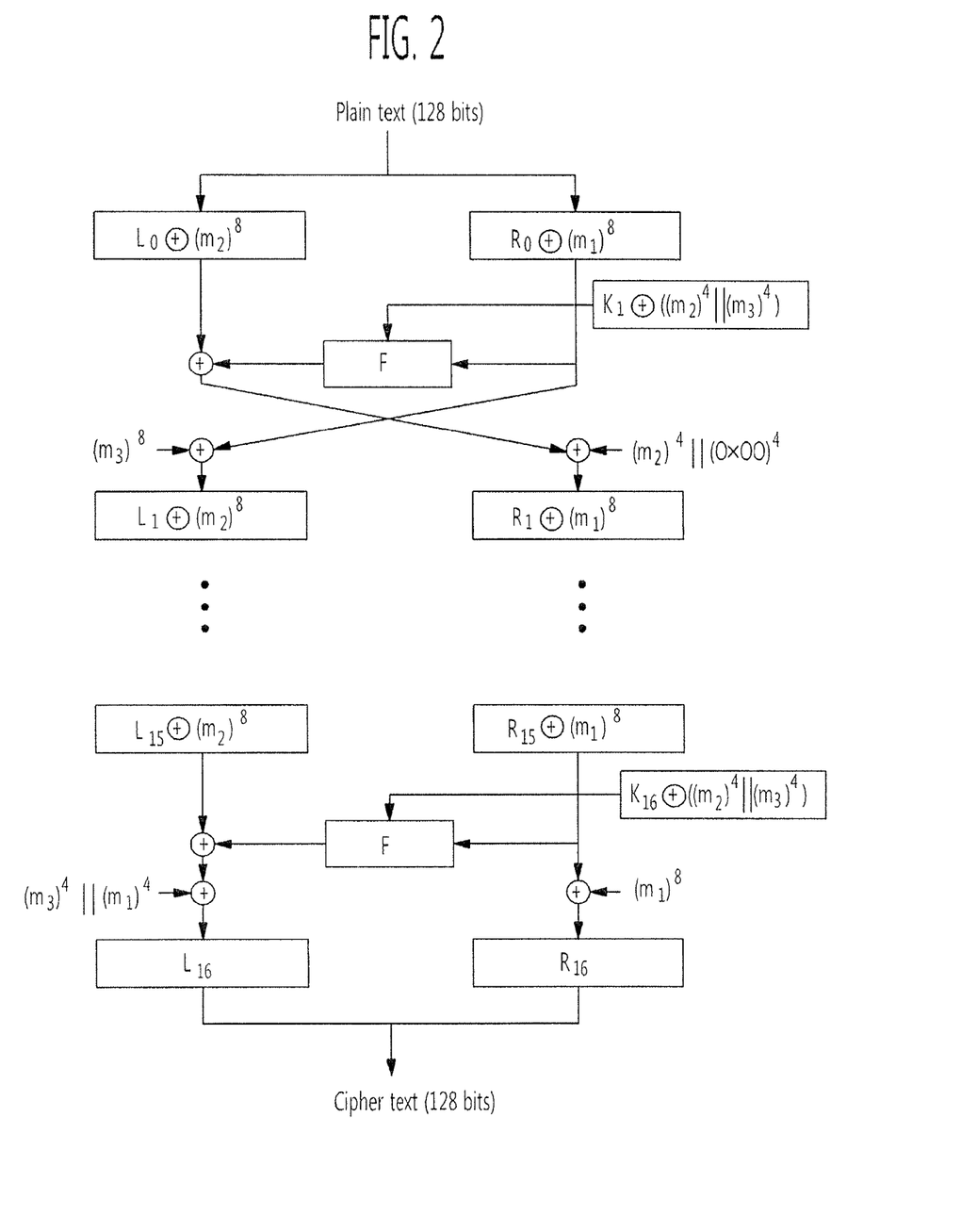
FIG. 2 is a view for explaining a SEED encryption algorithm according to an exemplary embodiment of the present invention.

FIG. 2 is a view for explaining a SEED encryption algorithm according to an exemplary embodiment of the present invention. "$\oplus$" denotes an exclusive logical sum (XOR) bit operation, and "||" denotes a concatenation for continuously disposing two or more bits.

Referring to FIG. 2, a SEED encryption algorithm divides a plain text block of 128 bits into upper and lower 64-bit data $L_i$ and $R_i$, performs 16 rounds using 16 64-bit round keys $K_j$, and finally outputs a cipher text of 128 bits.

A process of encrypting a plain text block of 128 bits will be described below in further detail.

First, a plain text block of 128 bits is divided into right 64 bits $R_0$ and left 64 bits $L_o$ to be stored. A round key $K_1$ is applied to an encryption function F to encrypt the right 64 bits $R_0$. The resultant value and the left 64 bits $L_0$ are exclusive-logical summed, and the resultant value is input to a new round. In this manner, 16 rounds are repeated. After 16 rounds are finished, $L_{16}$ and $R_{16}$ of 64 bits are added to output a cipher text block of 128 bits.

In the case in which a masking technique is applied to the SEED encryption algorithm, an input/output value is masked using a certain mask value in rounds excluding the last round, and a mask value used for masking is removed from an output value. Intermediate values generated during an encryption operation of the encryption function F are masked by a random value not to be revealed to an attacker.

An S-box operation and an addition operation which are non-linear operations are used in the encryption function F. Since the cost required for masking of a non-linear operation is much larger than the cost required for masking of a linear operation, efficiency of an overall mask technique depends on efficiency of is masking of a non-linear operation.

Therefore, the present invention suggests a masking technique which is efficient for an S-box operation and an addition operation which are non-linear operations, which will be described below in detail.

First, masking for an S-box operation will be described.

Figure 3:
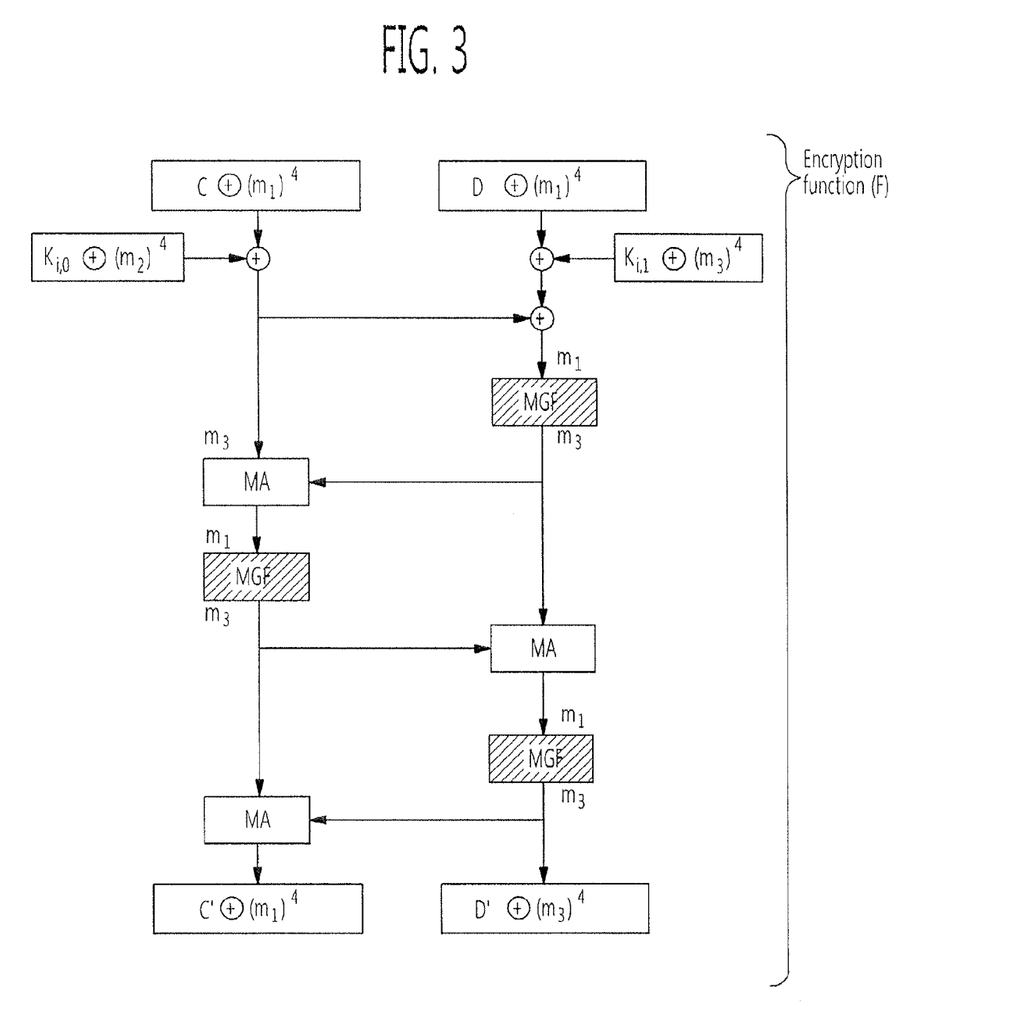
FIG. 3 is a view illustrating a structure of an encryption function.
Figure 4:
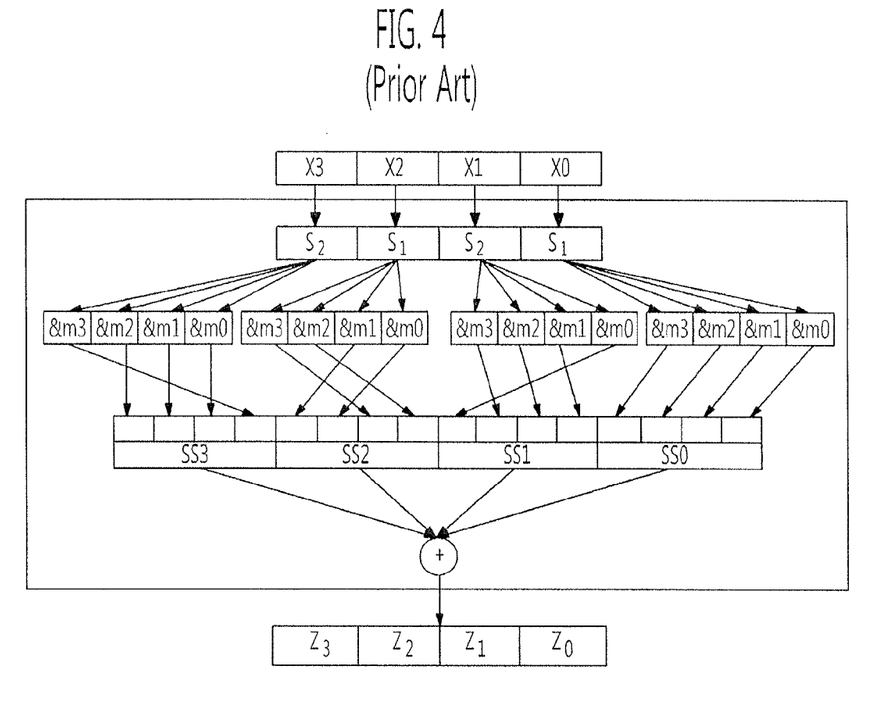
FIG. 4 is a view illustrating a structure of a conventional G function.

FIG. 3 is a view illustrating a structure of an encryption function F, and FIG. 4 is a view illustrating a structure of a conventional G function.

Referring to FIG. 3, the encryption function F receives two blocks C and D of 32-bit units and two round keys $K_i$ of 32-bit units and outputs two blocks C' and D' of 32-bit units by a masking G function (MGF) and a masking addition (MA) operation.

Generally, the G function includes four S-boxes $S_1$ and $S_2$, an AND operation, and an XOR operation as illustrated in FIG. 4.

The S-boxes $S_1$ and $S_2$ are non-linear conversion functions and may be defined as in Equation 1.

$$\begin{aligned}
S_1(x) &= A_1 \cdot x^{247} \oplus a \\
S_2(x) &= A_2 \cdot x^{251} \oplus b,
\end{aligned} \quad \text{Equation 1}$$

where $$A_1 = \begin{pmatrix} 1 & 0 & 0 & 0 & 1 & 0 & 1 & 0 \\ 1 & 1 & 1 & 1 & 1 & 1 & 1 & 0 \\ 1 & 0 & 0 & 0 & 0 & 1 & 0 & 1 \\ 0 & 1 & 0 & 0 & 0 & 0 & 1 & 0 \\ 0 & 1 & 0 & 0 & 0 & 1 & 0 & 1 \\ 0 & 0 & 1 & 0 & 0 & 0 & 0 & 1 \\ 1 & 0 & 0 & 0 & 1 & 0 & 0 & 0 \\ 0 & 0 & 0 & 1 & 0 & 1 & 0 & 0 \end{pmatrix}, \quad A_2 = \begin{pmatrix} 0 & 1 & 0 & 0 & 0 & 1 & 0 & 1 \\ 1 & 0 & 0 & 0 & 0 & 1 & 0 & 1 \\ 1 & 1 & 1 & 1 & 1 & 1 & 1 & 0 \\ 0 & 0 & 1 & 0 & 0 & 0 & 0 & 1 \\ 1 & 0 & 0 & 0 & 1 & 0 & 1 & 0 \\ 1 & 0 & 0 & 0 & 1 & 0 & 0 & 0 \\ 0 & 1 & 0 & 0 & 0 & 0 & 1 & 0 \\ 0 & 0 & 0 & 1 & 0 & 1 & 0 & 0 \end{pmatrix},$$

$$a = \begin{pmatrix} 1 \\ 0 \\ 1 \\ 0 \\ 1 \\ 0 \\ 0 \\ 1 \end{pmatrix}, \text{ and } b = \begin{pmatrix} 0 \\ 0 \\ 1 \\ 1 \\ 1 \\ 0 \\ 0 \\ 0 \end{pmatrix}.$$

As can be seen from Equation 1, since $S_1(x)$ and $S_2(x)$ are very complicated in operation process, $S_1(x)$ and $S_2(x)$ are embodied by look-up tables and stored in a read only memory (ROM). For each encryption operation, two look-up tables are masked by a new mask value and thereafter stored in a random access memory (RAM) for use.

However, this method has a problem in that since two look-up tables have to be masked, respectively, 512 XOR operations have to be performed each time, and a RAM of 512 bytes is needed to store two masked look-up tables.

To this end, according to an exemplary embodiment of the present invention, one look-up table is masked at the time of a masking operation of $S_1(x)$ and $S_2(x)$, which will be described in further detail.

First, since input and outputs of $S1(x)$ and $S2(x)$ in Equation 1 are elements of an 8×8 binary matrix, a relationship of Equation 2 is established.

$$(x^{-1})^8 = x^{247} \bmod p(x), \quad (x^{-1})^4 = x^{251} \bmod p(x) \quad \text{Equation 2}$$

where $p(x)$ is an irreducible polynomial expressed by $x^8+x^6+x^5+x+1$.

Therefore, $S_1(x)$ and $S_2(x)$ of Equation 1 may be expressed as in Equation 3, respectively.

$$\text{Equation 3}$$

$$S_1(x) = A_1 \cdot x^{247 \oplus} a = A_1 \cdot x^{-8 \oplus} a = A_1 B_1 \cdot x^{-1 \oplus} a = C_1 \cdot x^{-1 \oplus} a$$

$$S_2(x) = A_2 \cdot x^{251 \oplus} b = A_2 \cdot x^{-4 \oplus} b = A_2 B_2 \cdot x^{-1 \oplus} b = C_2 \cdot x^{-1 \oplus} b,$$

where $$B_1 = \begin{pmatrix} 1 & 1 & 0 & 1 & 0 & 1 & 0 & 0 \\ 0 & 1 & 1 & 1 & 0 & 1 & 1 & 0 \\ 0 & 1 & 1 & 1 & 1 & 1 & 1 & 0 \\ 0 & 0 & 0 & 1 & 0 & 1 & 0 & 0 \\ 0 & 1 & 1 & 0 & 0 & 0 & 0 & 0 \\ 1 & 0 & 0 & 1 & 0 & 0 & 0 & 0 \\ 1 & 1 & 0 & 0 & 1 & 1 & 1 & 0 \\ 0 & 1 & 0 & 0 & 0 & 1 & 1 & 1 \end{pmatrix}, B_2 = \begin{pmatrix} 1 & 0 & 1 & 1 & 0 & 0 & 0 & 0 \\ 1 & 0 & 1 & 1 & 0 & 1 & 0 & 0 \\ 1 & 1 & 0 & 1 & 0 & 1 & 0 & 0 \\ 0 & 0 & 0 & 1 & 1 & 0 & 1 & 0 \\ 0 & 0 & 0 & 0 & 1 & 0 & 0 & 0 \\ 1 & 0 & 1 & 0 & 0 & 0 & 0 & 0 \\ 1 & 1 & 1 & 1 & 0 & 1 & 0 & 0 \\ 0 & 0 & 1 & 1 & 1 & 1 & 0 & 1 \end{pmatrix},$$

$$C_1 = \begin{pmatrix} 0 & 1 & 1 & 1 & 1 & 0 & 1 & 0 \\ 1 & 1 & 1 & 1 & 0 & 1 & 1 & 0 \\ 0 & 0 & 0 & 0 & 0 & 0 & 1 & 1 \\ 1 & 0 & 1 & 1 & 1 & 0 & 0 & 0 \\ 1 & 0 & 1 & 0 & 0 & 0 & 0 & 1 \\ 0 & 0 & 1 & 1 & 1 & 0 & 0 & 1 \\ 1 & 0 & 1 & 1 & 0 & 1 & 0 & 0 \\ 1 & 0 & 0 & 0 & 0 & 1 & 0 & 0 \end{pmatrix}, \text{ and } C_2 = \begin{pmatrix} 0 & 0 & 1 & 0 & 1 & 0 & 0 & 1 \\ 0 & 0 & 1 & 0 & 1 & 1 & 0 & 1 \\ 1 & 0 & 0 & 1 & 0 & 1 & 1 & 0 \\ 1 & 1 & 1 & 0 & 1 & 0 & 0 & 1 \\ 0 & 1 & 0 & 0 & 1 & 1 & 0 & 0 \\ 1 & 0 & 1 & 1 & 1 & 0 & 0 & 0 \\ 0 & 1 & 0 & 0 & 0 & 0 & 0 & 0 \\ 1 & 0 & 1 & 1 & 1 & 0 & 1 & 0 \end{pmatrix}$$

As can be seen from Equation 3, one inverse matrix $(x^{-1})$ is commonly included in $S_1(x)$ and $S_2(x)$.

That is, when the inverse matrix $(x-1)$ is embodied by one look-up table, only one look-up table is masked at the time of the mask operation of $S_1(x)$ and $S_2(x)$. Therefore, computation cost needed for the masking operation is reduced to half, and a use amount of the RAM for storing the masked look-up table is reduced to half.

The binary matrices $C_1$ and $C_2$ (denoted as simply C) are linear operations and thus have a characteristic of Equation 4.

$$C(x^{-1 \oplus} m) = C(x^{-1}) \oplus C(m) \quad \text{Equation 4}$$

where $x^{-1}$ denotes an inverse matrix, and m denotes a mask value.

As can be seen from Equation 4, since the binary matrices $C_1$ and $C_2$ are linear operations and so are not affected by the mask value m, when an output of C(x) for any x (in which $x^{-1 \oplus}$ in may not be considered) is computed in advance and stored in a ROM as a look-up table, it is unnecessary to compute $C(x^{-1}) \oplus C(m)$ for any $x^{-1 \oplus} m$ each time, and thus an operation speed can be further improved.

Thereafter, according to an exemplary embodiment of the present invention, after the inverse matrix $x^{-1}$ and the binary matrices $C_1$ and $C_2$ are embodied by look-up tables, masking of the S-boxes $S_1(x)$ and $S_2(x)$ is performed using the look-up tables, and thus the computation cost and the use amount of the RAM can be reduced, which will be described below in further detail.

Figure 5:
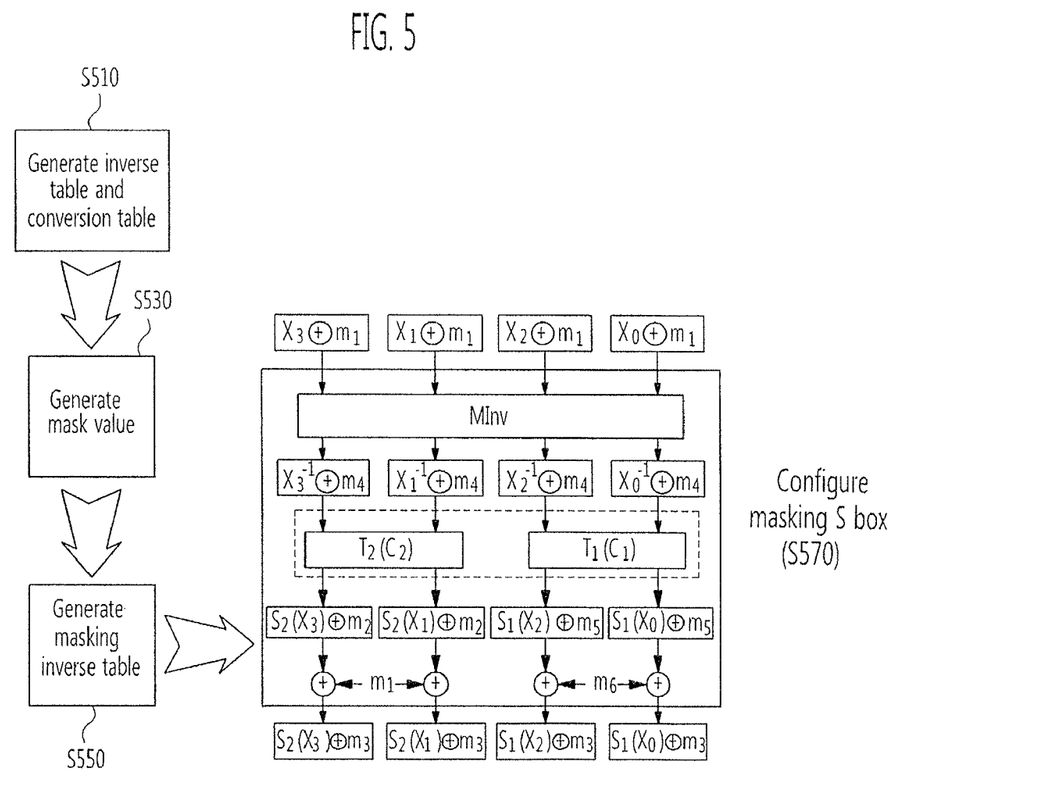
FIG. 5 is a view for explaining a masking method for an S-box operation according to an exemplary embodiment of the present invention.

FIG. 5 is a view for explaining a masking method for an S-box operation according to an exemplary embodiment of the present invention.

Referring to FIG. 5, the masking method according to an exemplary embodiment of the present invention includes generating an inverse table and a conversion table (S510), generating a mask value (S530), generating a masking inverse table (S550), and configuring a masking S-box (S570). The respective operations will be described below in further detail.

(1) Operation of Generating an Inverse Table and a Conversion Table (S510)

In this operation, an inverse table Inv through which two S-boxes $S_1(x)$ and $S_2(x)$ are masked by one table is generated and stored in a ROM as a look-up table. The inverse table Inv is one in which the inverse matrix $x^{-1}$ is embodied as a look-up table.

First and second conversion tables $T_1$ and $T_2$ for additional conversion according to a use of the inverse table Inv are generated and stored in a ROM as a look-up table. The first and second conversion tables $T_1$ and $T_2$ are ones in which the binary matrices $C_1$ and $C_2$ are embodied as look-up tables.

(2) Operation of Generating a Mask Value (S530)

In this operation, six one-byte mask values $m_1$, $m_2$, $m_3$, $m_4$, $m_5$, and $m_6$ and two four-bit mask values $m_a$ and $m_b$ which are needed for masking are generated by Equation 5.

$$m_1 = \text{rand}(\ ), m_2 = C_2[m_4] \oplus 0x38, m_3 = m_1 \oplus m_2,$$

$$m_4 = \text{rand}(\ ), m_5 = C_1[m_4] \oplus 0xa9, m_6 = m_3 \oplus m_5,$$

$$m_a = \text{rand}(\ ), m_b = \text{rand}(\ ) \quad \text{Equation 5.}$$

(3) Operation of Generating a Masking Inverse Table (S550)

In this operation, the inverse table Inv stored in a ROM is masked by a new mask value $m_4$ to generate a masking inverse table MInv, and thereafter the generated masking inverse table MInv is stored in a RAM.

The masking inverse table MInv outputs a value $x^{-1 \oplus} m_4$ in which inverse information $x^{-1}$ and $m_4$ are XORed and masked, corresponding to a value in which original information x and $m_1$ are XORed and masked.

The masking inverse table MInv is generated by Equation 6.

for i=0 to 255

$$M\text{Inv}(x_i \oplus m_1) = \text{Inv}(x_i) \oplus m_4 \quad \text{Equation 6}$$

(4) Operation of Configuring a Masking S-Box (S570)

In this operation, a masking S-box which outputs a masked S-box is configured using the masking inverse table MInv and the first and second conversion tables $T_1$ and $T_2$.

That is, a masking S-box is configured using the masking inverse table MInv and the first and second conversion tables $T_1$ and $T_2$ so that masking operations of the S-boxes $S_1(x)$ and $S_2(x)$ can be performed.

An operation of the masking S-box is performed through the following process.

First, when original information $x \oplus m_1$ which is masked by $m_1$ is input, inverse information $x^{-1^\oplus} m_4$ which is masked by $m_4$ is output using the masking inverse table MInv.

Next, the masked inverse information $x^{-1^\oplus} m_4$ is converted into a masked S-box $S_1(x) \oplus m_5$ using the first conversion table $T_1$, and the masked inverse information $x^{-1^\oplus} m_4$ is converted into a masked S-box $S_2(x) \oplus m_2$ using the second conversion table $T_2$.

Outputs of the first and second conversion tables $T_1$ and $T_2$ are masked by $m_6$ and $m_1$, respectively, to finally output S-boxes $S_1(x) \oplus m_3$ and $S_2(x) \oplus m_3$ which are masked by a certain mask value $m_3$.

For example, when $x_0 \oplus m_1$ and $x_2 \oplus m_1$ are input, the masking inverse table MInv outputs $x_0^{-1^\oplus} m_4$ and $x_2^{-1^\oplus} m_4$, corresponding to input of $x_0 \oplus m_1$ and $x_2 \oplus m_1$, respectively. The first conversion table $T_1$ outputs $S_1(x_0) \oplus m_5$ and $S_1(x_2) \oplus m_5$, corresponding to input of $x_0^{-1^\oplus} m_4$ and $x_2^{-1^\oplus} m_4$, respectively. The outputs $S_1(x_0) \oplus m_5$ and $S_1(x_2) \oplus m_5$ of the first conversion table $T_1$ are masked by $m_6$, and $S_1(x_0) \oplus m_3$ and $S_1(x_2) \oplus m_3$ masked by $m_3$ are finally output.

Further, the masking inverse table MInv outputs $x_1^{-1^\oplus} m_4$ and $x_3^{-1^\oplus} m_4$, corresponding to input of $x_1 \oplus m_1$ and $x_3 \oplus m_1$, respectively. The second conversion table $T_2$ outputs $S_2(x_1) \oplus m_2$, and $S_2(x_3) \oplus m_2$, corresponding to input of $x_1^{-1^\oplus} m_4$ and $x_3^{-1^\oplus} m_4$, respectively. The outputs $S_2(x_1) \oplus m_2$ and $S_2(x_3) \oplus m_2$ of the second conversion table $T_2$ are masked by $m_1$, and $S_2(x_1) \oplus m_3$ and $S_2(x_3) \oplus m_3$ masked by $m_3$ are finally output.

Therefore, operations of masking S-boxes $MaskedS_1(x \oplus m_1)$ and $MaskedS_2(x \oplus m_1)$ for original information $x \oplus m_1$ masked by $m_1$ may be expressed as in Equation 7.

$$\begin{aligned}
MaskedS_1(x \oplus m_1) &= T_1(MInv(x \oplus m_1)) \oplus m_6 \\
&= C_1 \cdot (x^{-1^\oplus} m_4) \oplus m_5 \oplus m_3 \\
&= C_1 \cdot x^{-1^\oplus} C_1 \cdot m_4 \oplus C_1 \cdot \\
&\quad m_4 \oplus a \oplus m_3 \\
&= C_1 \cdot x^{-1^\oplus} a \oplus m_3 \\
&= S_1(x) \oplus m_3 \\
MaskedS_2(x \oplus m_1) &= T_2(MInv(x \oplus m_1)) \oplus m_1 \\
&= C_2 \cdot (x^{-1^\oplus} m_4) \oplus m_2 \oplus m_2 \oplus m_1 \\
&= C_2 \cdot x^{-1^\oplus} C_2 \cdot m_4 \oplus C_2 \cdot \\
&\quad m_4 \oplus b \oplus m_3 \\
&= C_2 \cdot x^{-1^\oplus} b \oplus m_3 \\
&= S_2(x) \oplus m_3.
\end{aligned} \qquad \text{Equation 7}$$

As can be seen from Equation 7, since one inverse table Inv is masked at the time of configuring the masking S-boxes $MaskedS_1(x \oplus m_1)$ and $MaskedS_2(x \oplus m_1)$, the computation cost and the use amount of the RAM necessary for the masking operation can be effectively reduced, and the operation speed and the memory efficiency can be greatly improved.

Next, a masking method for an addition operation according to an exemplary embodiment of the present invention will be described.

Referring to FIG. 3, in order to equally maintain a masking value for a masking G function (MGF), a masking addition (MA) operation in which masking is applied to an addition operation which is a non-linear operation is used in the encryption function F.

Generally, the addition operation includes both a Boolean masking operation and an arithmetic masking operation. When the Boolean masking operation and the arithmetic masking operation are mixed, the masking processing is very complicated.

To this end, according to an exemplary embodiment of the present invention, a form of an addition operation is converted through a process as in Equation 8, and then masking is performed.

Input: $x' = x \oplus (m_3)^4$, $y' = y \oplus (m_3)^4$, Output: $z' = (x+y) \oplus (m_1)^4$ 1. Temp=$BtoA(x')$ 2. $z'$=Temp+$(m_a)^8$ 3. Temp=$BtoA(y')$ 4. $z'=z'$+Temp 5. $z'=z'+2m_3$ 6. $z'=AtoB(z')$      Equation 8.

In Equation 8, $BtoA(x)$ is a function which converts a Boolean masking value into an arithmetic masking value and a function which outputs A which satisfies $A = x + (m_3)^4$ with respect to x' which satisfies $x' = x \oplus (m_3)^4$ as in Equation 9.

Input: $x' = x \oplus (m_3)^4$, Output: $A = x + (m_3)^4$

1. Temp=$x' \oplus (m_6)^4$

2. Temp=Temp$-(m_6)^4$

3. Temp=Temp$\oplus x'$

4. $A = x' \oplus (m_5)^4$

5. $A = A - (m_5)^4$

6. A=A$\oplus$Temp      Equation 9.

$AtoB(x)$ is a function which converts an arithmetic masking value into a Boolean masking value and a function which outputs B which satisfies $B = x \oplus (m_1)^4$ with respect to A which satisfies $A = x + (m_a)^8$ as in Equation 10.

Input: $A = x + (m_a)^8 = a_7 a_6 a_5 a_4 a_3 a_2 a_1 a_0$, Output: $B = x \oplus (m_1)^4 = b_7 b_6 b_5 b_4 b_3 b_2 b_1 b_0$ 1. $b_0 FT = (a_0)$ 2. a=0

3. For k from 1 to 7

3.1. $a_7 \ldots a_k = a_7 \ldots a_k - CT(a_{k-1}) + \lambda$ 3.2. $b_k = FT(a_k)$ 4. $B = B \oplus (m_1)^{4^\oplus} (m_b)^8$ 5. Return B      Equation 10.

In Equations 9 and 10, a FT function is a masking conversion function which outputs $x \oplus m_b$ with an input value $x + m_a$ (mod 16) using 4-bit random numbers $m_a$, $m_b$, and $\lambda$ (a 4-bit random value), and a CT function is a carry function for setting a carry value when $x' = x + m_a$ is equal to or larger than 16. The FT function and the CT function may be expressed as in Equation 11.

Input: $m_a$, $m_b$, $\lambda$, Output: FT, CT

1. For x from 0 to 15

1.1. $FT(x+m_a \bmod 16) = x \oplus m_b$

1.2. $CT(x) = (x < m_a)?(\lambda+1): \lambda$

2. Return FT, CT                                                       Equation 11.

The FT function and the CT function generated by Equation 11 are preferably stored in a ROM as look-up tables.

That is, the masking addition (MA) operation according to an exemplary embodiment may be summarized as follows.

First, a first input value x' of four bits which is Boolean-masked by $(m_3)^4$ is converted into an arithmetic masking value and thereafter masked by a $m_a$ value. Then, a second input value y' of four bits which is Boolean-masked by $(m_3)^4$ is converted into an arithmetic masking value. The first input value x' which is masked by the $m_a$ value and the second input value y' which is converted into the arithmetic masking value are added, and the addition resultant value is masked by $2m_3$. The value masked by $2m_3$ is converted into a Boolean masking value, so that an output value z' of four bits which is masked by $(m_1)^4$ is output.

Since masking is performed after converting the form of the addition operation which is a non-linear operation, the masking addition (MA) operation can be more simply performed.

As described above, according to the masking method of the present invention, a differential power analysis attack can be defended in a SEED encryption algorithm suitable for low memory and low-speed operation environments.

Further, according to the masking method of the present invention, an operation speed and memory efficiency are improved at the time of a masking operation for defending a differential power analysis attack in a SEED encryption algorithm.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A masking method of defending a power analysis attack in a SEED encryption algorithm, comprising:
   providing a processor and a memory, the memory having stored thereon instructions executable by the processor for:
   generating an inverse table and first and second conversion tables and storing the inverse table and the first and second conversion tables as look-up tables;
   generating mask values necessary for masking; masking the inverse table to generate one masking inverse table; and
   wherein after masked original information is input, then outputting a masked S-box using the one masking inverse table and the first and second conversion tables,
   wherein the first and second conversion tables are binary matrices in the memory, and
   wherein the one masking inverse table is an inverse matrix in the memory.

2. The masking method of claim 1, wherein the generating of the inverse table and the first and second conversion tables comprises:
   generating the inverse table using an inverse matrix and storing the inverse table as a look-up table; and
   generating the first and second conversion tables for addition conversion according to a use of the inverse table using binary matrices and storing the first and second conversion tables as look-up tables.

3. The masking method of claim 2, wherein in the generating of the first and second conversion tables, the binary matrices $C_1$ and $C_2$ are as follows:

$$C_1 = \begin{pmatrix} 0 & 1 & 1 & 1 & 1 & 0 & 1 & 0 \\ 1 & 1 & 1 & 1 & 0 & 1 & 1 & 0 \\ 0 & 0 & 0 & 0 & 0 & 0 & 1 & 1 \\ 1 & 0 & 1 & 1 & 1 & 0 & 0 & 0 \\ 1 & 0 & 1 & 0 & 0 & 0 & 0 & 1 \\ 0 & 0 & 1 & 1 & 1 & 0 & 0 & 1 \\ 1 & 0 & 1 & 1 & 0 & 1 & 0 & 0 \\ 1 & 0 & 0 & 0 & 0 & 1 & 0 & 0 \end{pmatrix} C_2 = \begin{pmatrix} 0 & 0 & 1 & 0 & 1 & 0 & 0 & 1 \\ 0 & 0 & 1 & 0 & 1 & 1 & 0 & 1 \\ 1 & 0 & 0 & 1 & 0 & 1 & 1 & 0 \\ 1 & 1 & 1 & 0 & 1 & 0 & 0 & 1 \\ 0 & 1 & 0 & 0 & 1 & 1 & 0 & 0 \\ 1 & 0 & 1 & 1 & 1 & 0 & 0 & 0 \\ 0 & 1 & 0 & 0 & 0 & 0 & 0 & 0 \\ 1 & 0 & 1 & 1 & 1 & 0 & 1 & 0 \end{pmatrix}.$$

4. The masking method of claim 3, wherein the generating of the mask values comprises generating six one-byte mask values $m_1$, $m_2$, $m_3$, $m_4$, $m_5$, and $m_6$ and two four-bit mask values $m_a$ and $m_b$ as follows:

$m_1 = \text{rand}()$, $m_2 = C_2[m_4] \oplus 0 \times 38$, $m_3 = m_1 \oplus m_2$, $m_4 = \text{rand}()$ $m_5 = C_1[m_4] \oplus 0 \times a9$, $m_6 = m_3 \oplus m_5$, $m_a = \text{rand}()$, $m_b = \text{rand}()$.

5. The masking method of claim 1, wherein the masking inverse table outputs masked inverse information, corresponding to masked original information.

6. The masking method of claim 1, wherein the outputting of the masked S-box using the one masking inverse table comprises: configuring a masking S-box using the one masking inverse table and the first and second conversion tables and outputting the masked S-box using the masking S-box.

7. The masking method of claim 6, wherein the outputting of the masked S-box using the one masking inverse table further comprises:
   when the masked original information is input, outputting the masked inverse information corresponding to the masked original information using the masking inverse table;
   outputting the masked S-box corresponding to the masked inverse information using the first and second conversion tables; and
   masking the masked S-box to output an S-box which is masked by a certain masked value.

8. The masking method of claim 7, wherein the outputting of the masked inverse information corresponding to the masked original information comprises outputting masked inverse information $x^{-1} \oplus m_4$ corresponding to the masked original information $x \oplus m_1$ using the masking inverse table.

9. The masking method of claim 8, wherein the outputting of the masked S-box corresponding to the masked inverse information comprises:
   outputting a first masked S-box $S_1(x) \oplus m_5$ corresponding to the masked inverse information $x^{-1} \oplus m_4$ using the first conversion table; and
   outputting a second masked S-box $S_2(x) \oplus m_2$ corresponding to the masked inverse information $x^{-1} \oplus m_4$ using the second conversion table.

10. The masking method of claim 9, wherein the masking of the masked S-box comprises:
    masking the first masked S-box $S_1(x) \oplus m_5$ to output a first S-box $S_1(x) \oplus m_3$ which is masked by a certain mask value $m_3$; and masking the second masked S-box $S_2(x) \oplus m_2$ to output a first S-box $S_2(x) \oplus m_3$ which is masked by a certain mask value $m_3$.

11. The masking method of claim 6, wherein in the outputting of the masked S-box using the one masking inverse table, the masked S-boxes $MaskedS_1(x \oplus m_1)$ and $MaskedS_2(x \oplus m_1)$ output the S-box $S_1(x) \oplus m_3$ and the S-box $S_2(x) \oplus m_3$ which are masked as follows:

$$MaskedS_1(x \oplus m_1) = T_1(MInv(x \oplus m_1)) \oplus m_6$$
$$= C_1 \cdot (x^{-1 \oplus} m_4) \oplus m_5 \oplus m_3$$
$$= C_1 \cdot x^{-1 \oplus} C_1 \cdot m_4 \oplus C_1 \cdot m_4 \oplus a \oplus m_3$$
$$= C_1 \cdot x^{-1 \oplus} a \oplus m_3$$
$$= S_1(x) \oplus m_3$$
$$MaskedS_2(x \oplus m_1) = T_2(MInv(x \oplus m_1)) \oplus m_1$$
$$= C_2 \cdot (x^{-1 \oplus} m_4) \oplus m_2 \oplus m_2 \oplus m_1$$
$$= C_2 \cdot x^{-1 \oplus} C_2 \cdot m_4 \oplus C_2 \cdot m_4 \oplus b \oplus m_3$$
$$= C_2 \cdot x^{-1 \oplus} b \oplus m_3$$
$$= S_2(x) \oplus m_3.$$

12. The masking method of claim 1, further comprising, after the outputting of the masked S-box using the one masking inverse table, performing a masking addition (MA) operation for equally maintaining a masking value for a masking G function (MGF) including the masked S-box.

13. The masking method of claim 12, wherein the performing of the masking addition operation comprises:
converting a first input value of 32 bits which is Boolean-masked into an arithmetic masking value and thereafter performing masking;
converting a second input value of 32 bits which is Boolean-masked into an arithmetic masking value;
adding the arithmetic masking value obtained in the converting of the first input value and the arithmetic masking value obtained in the converting of the second input value and thereafter performing masking; and
converting the arithmetic masking value obtained in the adding of the arithmetic masking value into a Boolean masking value.

14. The masking method of claim 13, wherein a masking conversion function and a carry function are used in the masking addition operation.

15. A masking method of defending a power analysis attack in a SEED encryption algorithm, comprising:
providing a processor and a memory, the memory having stored thereon instructions executable by the processor for:
generating an inverse table and first and second conversion tables and storing the inverse table and the first and second conversion tables as look-up tables;
generating mask values necessary for masking;
masking the inverse table to generate one masking inverse table; and when masked original information is input, outputting a masked S-box using the one masking inverse table and the first and second conversion tables,
wherein the outputting of the masked S-box using the one masking inverse table comprises: configuring a masking S-box using the one masking inverse table and the first and second conversion tables and outputting the masked S-box using the masking S-box,
wherein the outputting of the masked S-box using the one masking inverse table further comprises:
when the masked original information is input, outputting the masked inverse information corresponding to the masked original information using the masking inverse table;
outputting the masked S-box corresponding to the masked inverse information using the first and second conversion tables; and
masking the masked S-box to output an S-box which is masked by a certain masked value,
wherein the outputting of the masked inverse information corresponding to the masked original information comprises outputting masked inverse information $x^{-1 \oplus} m_4$ corresponding to the masked original information $x \oplus m_1$ using the masking inverse table.

16. The masking method of claim 15, wherein the outputting of the masked S-box corresponding to the masked inverse information comprises:
outputting a first masked S-box $S_1(x) \oplus m_5$ corresponding to the masked inverse information $x^{-1 \oplus} m_4$ using the first conversion table; and
outputting a second masked S-box $S_2(x) \oplus m_2$ corresponding to the masked inverse information $x^{-1 \oplus} m_4$ using the second conversion table.

17. The masking method of claim 16, wherein the masking of the masked S-box comprises:
masking the first masked S-box $S_1(x) \oplus m_5$ to output a first S-box $S_1(x) \oplus m_3$ which is masked by a certain mask value $m_3$; and
masking the second masked S-box $S_2(x) \oplus m_2$ to output a first S-box $S_2(x) \oplus m_3$ which is masked by a certain mask value $m_3$.

18. The masking method of claim 15, wherein in the outputting of the masked S-box using the one masking inverse table, the masked S-boxes $MaskedS_1(x \oplus m_1)$ and $MaskedS_2(x \oplus m_1)$ output the S-box $S_1(x) \oplus m_3$ and the S-box $S_2(x) \oplus m_3$ which are masked as follows:

$$MaskedS_1(x \oplus m_1) = T_1(MInv(x \oplus m_1)) \oplus m_6$$
$$= C_1 \cdot (x^{-1 \oplus} m_4) \oplus m_5 \oplus m_3$$
$$= C_1 \cdot x^{-1 \oplus} C_1 \cdot m_4 \oplus C_1 \cdot m_4 \oplus a \oplus m_3$$
$$= C_1 \cdot x^{-1 \oplus} a \oplus m_3$$
$$= S_1(x) \oplus m_3$$
$$MaskedS_2(x \oplus m_1) = T_2(MInv(x \oplus m_1)) \oplus m_1$$
$$= C_2 \cdot (x^{-1 \oplus} m_4) \oplus m_2 \oplus m_2 \oplus m_1$$
$$= C_2 \cdot x^{-1 \oplus} C_2 \cdot m_4 \oplus C_2 \cdot m_4 \oplus b \oplus m_3$$
$$= C_2 \cdot x^{-1 \oplus} b \oplus m_3$$
$$= S_2(x) \oplus m_3.$$

* * * * *